US011487872B2

(12) United States Patent
McDonough

(10) Patent No.: US 11,487,872 B2
(45) Date of Patent: Nov. 1, 2022

(54) DETECTION OF HARDWARE SECURITY ATTACKS

(71) Applicant: Hewlett Packard Enterprise Development LP, Houston, TX (US)

(72) Inventor: Timothy N. McDonough, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 759 days.

(21) Appl. No.: 16/212,873

(22) Filed: Dec. 7, 2018

(65) Prior Publication Data

US 2020/0184076 A1 Jun. 11, 2020

(51) Int. Cl.
*G06F 21/55* (2013.01)
*G06F 21/56* (2013.01)
*G06F 21/57* (2013.01)
*G06F 21/85* (2013.01)

(52) U.S. Cl.
CPC .......... *G06F 21/554* (2013.01); *G06F 21/567* (2013.01); *G06F 21/575* (2013.01); *G06F 21/85* (2013.01); *G06F 2221/034* (2013.01)

(58) Field of Classification Search
None
See application file for complete search history.

(56) References Cited

U.S. PATENT DOCUMENTS

| 8,176,336 B1 * | 5/2012 | Mao ..................... G06F 21/6218 713/189 |
| 9,262,632 B2 | 2/2016 | Reed et al. |
| 9,298,909 B2 * | 3/2016 | Du ............................. G06F 1/28 |
| 9,509,587 B1 | 11/2016 | Marquardt et al. |
| 9,792,143 B1 * | 10/2017 | Potlapally ........... G06F 21/6218 |
| 10,546,130 B1 * | 1/2020 | Chaney ................. G06F 21/725 |
| 10,733,291 B1 * | 8/2020 | McLeod ............. G06F 11/3058 |
| 10,783,248 B2 * | 9/2020 | Khorrami ........... G06F 11/3058 |
| 10,896,251 B2 * | 1/2021 | Jonsson .................. G06F 21/16 |
| 2003/0061513 A1 * | 3/2003 | Tsafnat ................... G06F 21/55 709/224 |

(Continued)

FOREIGN PATENT DOCUMENTS

| CN | 206281910 U | 6/2017 | |
| WO | WO-2020037485 A1 * | 2/2020 | ............. H03K 21/40 |

OTHER PUBLICATIONS

Advanced Micro Devices, Inc., "Embedded Systems Engineering," powered by EECatalog, Mar. 2018, pp. 1-65.

(Continued)

*Primary Examiner* — Michael Pyzocha
(74) *Attorney, Agent, or Firm* — Tong, Rea, Bentley & Kim, LLC

(57) ABSTRACT

In example implementations, an apparatus is provided. The apparatus includes an input sensor, a memory, a comparator, and a processor. The processor is communicatively coupled to the input sensor, the memory, and the comparator to control operation of the input sensor, the memory, and the comparator. The input sensor is to measure a bus signal of a computing device. The memory is to store the bus signal that is measured and a reference bus signal. The comparator is to compare the bus signal that is measured to the reference bus signal to detect a hardware security attack.

20 Claims, 6 Drawing Sheets

(56) References Cited

U.S. PATENT DOCUMENTS

| | | | | |
|---|---|---|---|---|
| 2007/0300053 A1* | 12/2007 | Dale | ................... | H04L 9/08 |
| | | | | 713/2 |
| 2008/0260150 A1* | 10/2008 | De Clercq | ............ | G06F 9/3017 |
| | | | | 380/255 |
| 2009/0172472 A1* | 7/2009 | Sun | ..................... | G06F 11/1417 |
| | | | | 714/36 |
| 2013/0318607 A1* | 11/2013 | Reed | ...................... | G06F 21/52 |
| | | | | 726/23 |
| 2015/0091594 A1* | 4/2015 | Hamilton | ................ | G06N 3/02 |
| | | | | 324/754.21 |
| 2016/0048462 A1 | 2/2016 | O'Loughlin et al. | | |
| 2016/0357963 A1* | 12/2016 | Sherman | ............... | G06F 21/566 |
| 2017/0364683 A1* | 12/2017 | Willden | .................. | G06F 21/53 |
| 2018/0367553 A1* | 12/2018 | Hayden | ................. | G06N 3/084 |
| 2019/0236281 A1* | 8/2019 | Hershman | .............. | G06F 21/85 |
| 2019/0253439 A1* | 8/2019 | Payton | ................... | H04L 12/40 |
| 2019/0384915 A1* | 12/2019 | Hars | ..................... | H04L 9/3236 |
| 2020/0074275 A1* | 3/2020 | Xia | ...................... | G06N 3/0445 |
| 2020/0081785 A1* | 3/2020 | Chen | .................... | G06F 11/348 |
| 2021/0067523 A1* | 3/2021 | Kamp | ................ | H04L 63/1425 |

OTHER PUBLICATIONS

Yann Loisel and Stephane Di Vito, "Securing the IoT: Part 2—Secure Boot as Root of Trust," Maxim Integrated, Jan. 11, 2015, pp. 1-8 (online), Retrieved from the Internet on Sep. 27, 2018 at URL: <embedded.com/design/safety-and-security/4438300/Securing-the-IoT--Part-2---Secure-boot-as-root-of-trust->.

* cited by examiner

DETECTION OF HARDWARE SECURITY ATTACKS

BACKGROUND

Computer hardware can be susceptible to various types of security attacks. Security of hardware can be infiltrated during manufacturing and before the hardware is delivered to an end customer. These security attacks can compromise sensitive information that is passed through or processed by the hardware.

For example, when hardware is manufactured, some manufacturing facilities may change the specifications or add additional hardware components that are outside of the specifications. The compromised hardware may then be installed at the customer site and used to collect sensitive or confidential information.

DETAILED DESCRIPTION

Examples described herein provide a method and apparatus to detect hardware security attacks. As discussed above, computer hardware can be susceptible to various types of security attacks. Security of hardware can be infiltrated during manufacturing and before the hardware is delivered to an end customer. These security attacks can compromise sensitive information that is passed through or processed by the hardware.

Some methods attempt to detect these hardware attacks, but all have certain shortcomings. Some example methods may include hardware root of trust, silicon root of trust, trusted platform module, and the like. These methods all attempt to provide protection against firmware attacks.

The present disclosure provides a method and apparatus that takes a logical approach to detect security attacks. Thus, even if the physical deterrents are overcome by a hacker, the present disclosure may still detect the hardware security attack. For example, each boot sequence of a processor or computing hardware may have a certain profile of bus signals as instructions are accessed from memory and executed. However, compromised hardware may execute malicious code that may change the way and the timing of how the boot sequence executes. The present disclosure may detect the hardware security attack by monitoring the bus signal profile of a boot sequence of a computing system. As a result, the present disclosure may improve security of hardware and improve detection of hardware security attacks, even from added hardware that may be undetectable by the naked eye. In addition, the present disclosure may change the way a computing system operates by adding a security check during startup.

Figure 1:
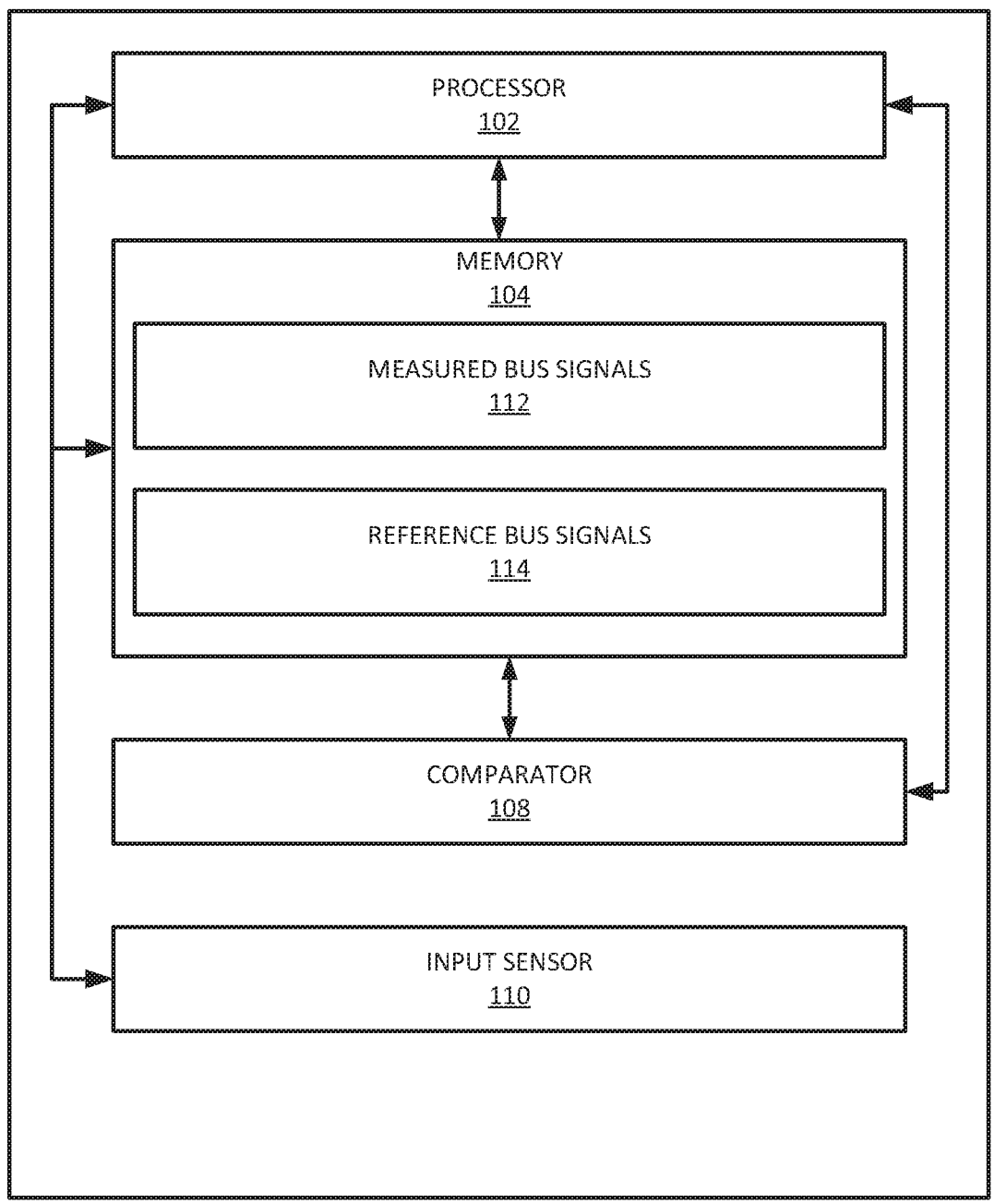
FIG. 1 is a block diagram of an example apparatus to detect a hardware security attack of the present disclosure.

FIG. 1 illustrates an example apparatus 100 of the present disclosure. The apparatus 100 may be a trusted measuring device to test computing devices or systems to ensure that the firmware of the computing device has not been modified, hacked, or compromised. For example, the apparatus 100 may be a device that may measure various signals of a computing device. For example, the apparatus 100 may be an oscilloscope that has been modified to measure certain bus signals and to perform the functions described herein.

In one example, the apparatus 100 may include a processor 102, a memory 104, a comparator 108, and an input sensor 110. The processor 102 may be communicatively coupled to the memory 104, the comparator 108, and the input sensor 110. The processor 102 may control operation of the comparator 108 and the input sensor 110.

The input sensor 110 may comprise probes or devices that can measure electrical signals from a target computing system or device. In one example, the input sensor 110 may measure a bus signal of a computing device, as discussed below and illustrated in FIG. 2. The bus signal may be a signal that is generated by the computing device during execution of a boot loader instruction of the computing device.

Boot loader instructions may be instructions or software that may be executed when a computing device is powered on. The boot loader instructions may be executed to help load an operating system and prepare the operating system for execution. Boot loader instructions may be stored in non-volatile memory of the computing device (e.g., a read-only memory (ROM)). In one example, for an x86 processor, the boot loader instructions may be the ROM basic input/output system (BIOS). On a non-x86 processor, the boot loader instructions may be a "u-boot".

In one example, checking the signals measured during execution of the boot loader instructions may ensure that security of a computing device is verified before the computing device is used. For example, malicious code may be added as part of the boot loader instructions to cause certain applications in the operating system to be compromised without detection. If the boot loader instructions are compromised, the measured signals for the boot loader instructions may be different compared to how the measured signals should appear.

If the boot loader instructions appear to indicate that the computing device has been compromised, then the computing device can be powered down or the boot loader instructions can be stopped. Thus, if the computing device has been hacked, loss of sensitive information can be prevented. In other words, the computing device can be removed from use before confidential applications are executed, confidential information is electronically stored or transmitted, and the like.

In one example, the memory 104 may be a non-transitory computer readable medium that may store measured bus signals 112 and reference bus signals 114. In one example, the memory 104 may comprise different types of memory devices. For example, the memory 104 may include non-volatile memory (e.g., read-only memory (ROM)) to store the reference bus signals 114. The memory 104 may also include a register or a buffer to store the measured bus signals 112.

In one example, the reference bus signals 114 may be pre-defined bus signals or known bus signals associated with untampered or "good" computing systems. The reference bus signals 114 may provide a profile of bus signals that are measured over time.

Figure 3:
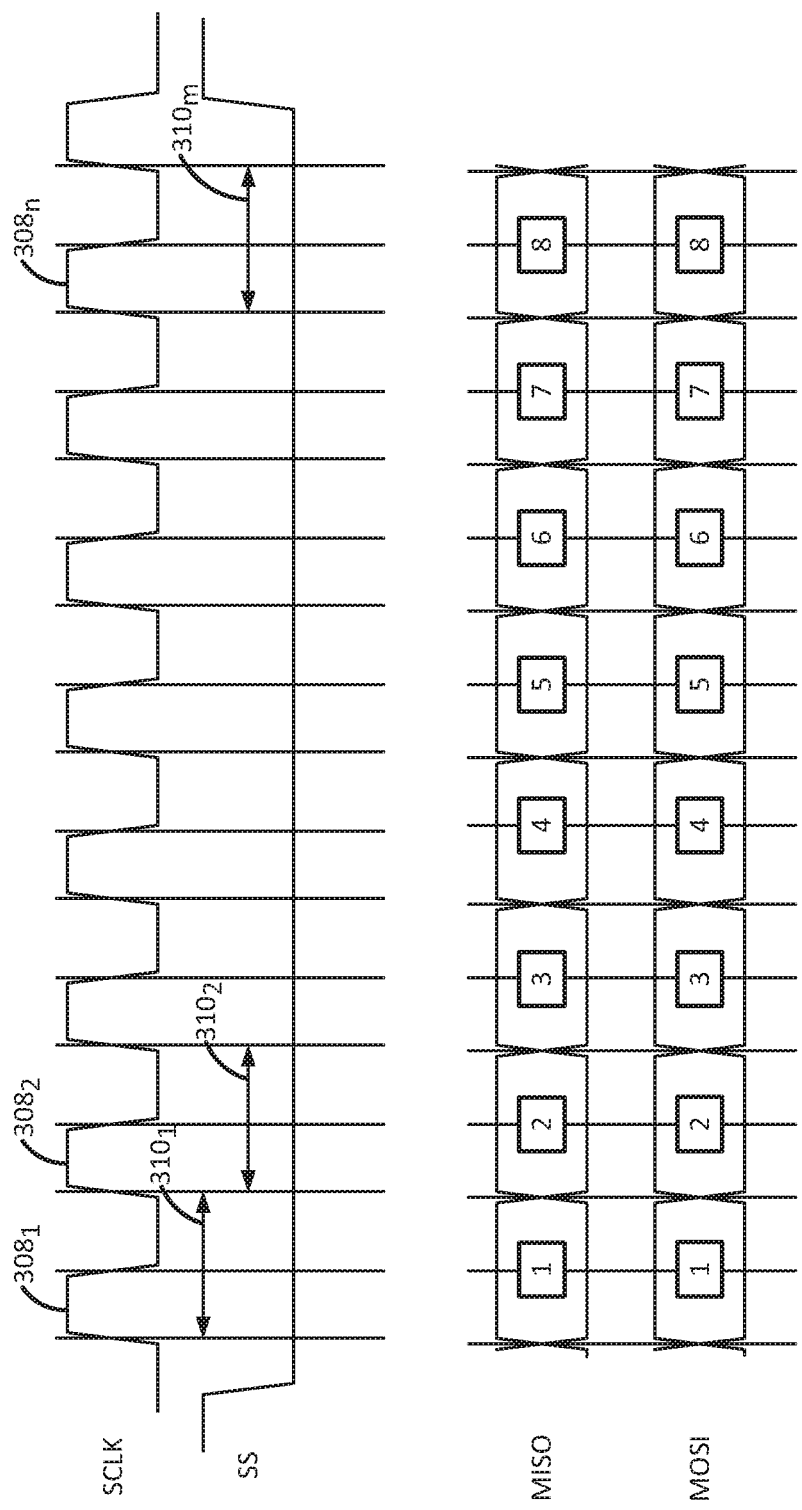
FIG. 3 is a block diagram of an example signal profile of a boot sequence of a computing system of the present disclosure.

FIG. 3 illustrates an example profile 300 of the reference bus signals 114. In one example, the profile 300 may include a graphical representation of the bus signals. The profile 300 may be graphed on a y-axis that represents a detected bus signal (e.g., 0 or 1) and an x-axis that represents time (e.g., in nanoseconds (ns)).

The profile 300 illustrates various different bus signals that can be measured. For example, the bus signals of a system clock (SCLK), a slave select (SS) or chip select, a master in, slave out (MISO), and a master out, slave in (MOSI) may be measured. The SCLK may show a period of each cycle of the bus signals. The SCLK may also synchronize data between a processor and other components within a computing device that is being monitored.

The SS may refer to a control line that may be used to select a particular chip or integrated circuit connected to the bus. The SS signal may be high when a particular slave chip is selected. In one example, if there are multiple slave chips connected to the bus, the bus signal of each slave chip may be measured.

The MOSI signal may indicate when address commands are issued by a processor of the computing device that is being monitored. The MISO signal may indicate when code instructions are returned from the slave chip.

In one example, at least the SCLK, the SS, and the MISO may be measured to obtain a bit value for the boot loader instructions. For example, the SCLK, the SS, and the MISO may provide an indication of the activity when a bus (e.g., a serial peripheral interface (SPI) bus) executes the boot loader instructions. As noted above, an uncompromised computing device, or a computing device that has not been hacked, may have a known sequence of activity for certain bus signals. For an SPI bus, the SCLK, the SS, and the MISO may properly characterize the execution of the boot loader instructions.

In one example, the profile 300 may include peaks $308_1$ to $308_n$ (hereinafter also referred to individually as a peak 308 or collectively as peaks 308). In one example, the each peak 308 may represent a detected bus signal. In addition, the profile 300 may track time spans $310_1$ to $310_m$ (hereinafter also referred to individually as a time span 310 or collectively as time spans 310) between each peak 308. In one example, each time span 310 may be a clock cycle and eight clock cycles may be a bus cycle. FIG. 3 illustrates an example of a profile 300 of bus signals associated with a computing system that has not been hacked or compromised.

In one example, when a target computing system is started or powered on, the processor of the computing system may begin accessing the memory to execute the boot loader instructions. In one example, the bus signals of the processor may be monitored or tracked for a predefined period of time. For example, the pre-defined period of time may be long enough to generate a reliable profile of bus signals for the processor (e.g., at least one bus cycle, several seconds, and the like). The memory 104 may store measured bus signals 112 that are monitored by the apparatus 100.

After the predefined period of time or bus cycles has expired, a profile may be generated for the measured bus signals 112. Observing and storing the profiles of the bus signals may consume memory and processing resources and be relatively expensive. To improve the efficiency of observing and storing the profiles, a hash or a checksum may be applied to the measured bus signals 112 before being accessed or provided to the comparator 108. The hash or the checksum may reduce the overall cost of memory and processing resources to observe and store the profiles. In other words, the hash or the checksum may help to improve the efficiency of verifying the data integrity of the measured bus signals 112 that are collected. Any type of hash or checksum may be applied (e.g., a message-digest algorithm 5 (MD5), a secure hash algorithm (SHA), and the like).

In one example, the comparator 108 may access the profile of the measured bus signals 112 and the reference bus signals 114. The comparator may compare the profile of the measured bus signals 112 and the profile of the reference bus signals 114 to determine if they match. If the profile of the measured bus signals 112 matches the profile of the reference bus signals 114, then no hardware security attack may be detected. If the profile of the measured bus signals 112 fails to match the profile of reference bus signals 114, then a hardware security attack may be detected.

Figure 4:
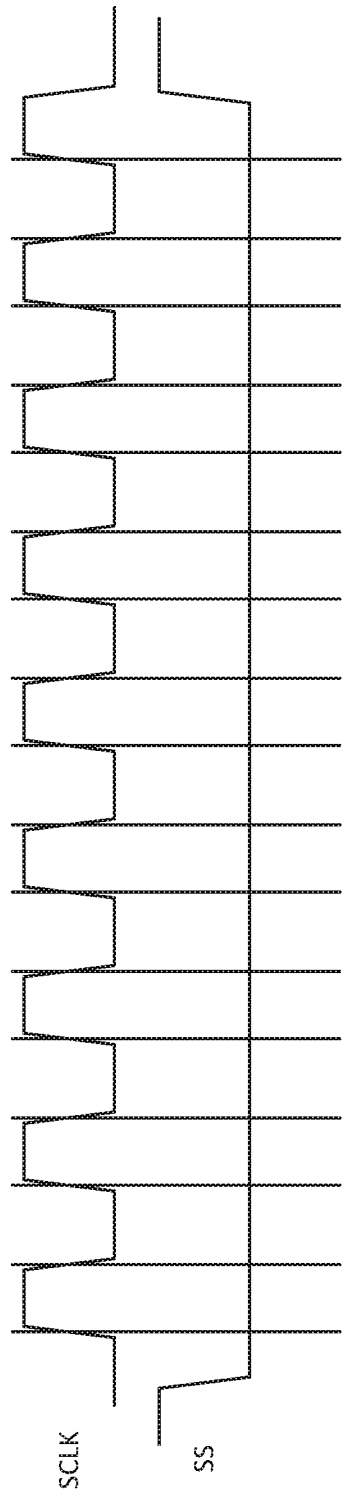
FIG. 4 is a block diagram of an example signal profile of a boot sequence of a computing system that has a hardware security attack of the present disclosure.
Figure 4:
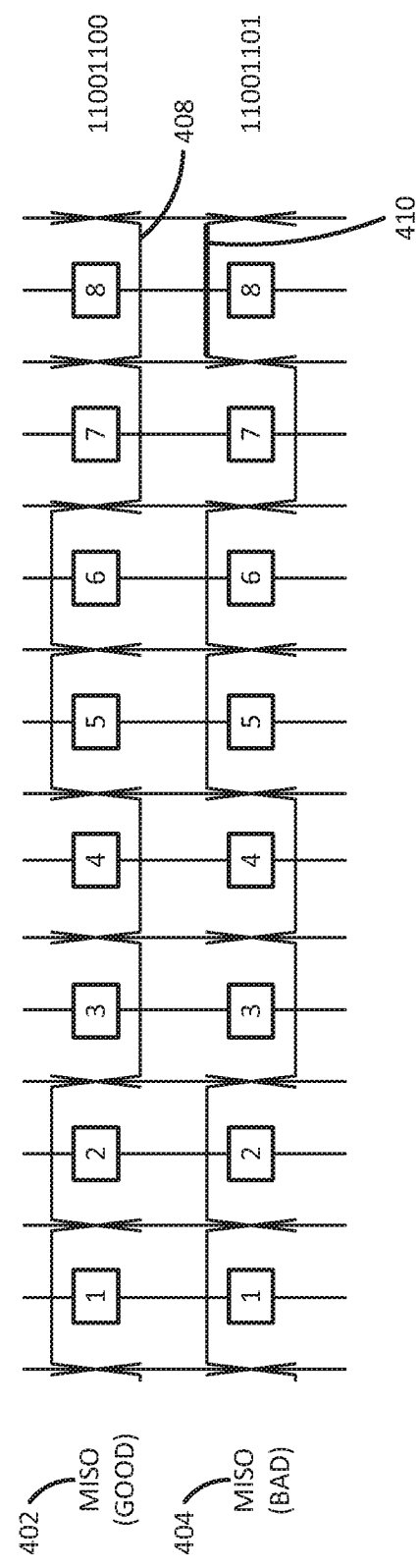

FIG. 4 illustrates an example of profiles 400 of the measured bus signals 112 that are monitored. In one example, the profiles 400 may include a MISO reference profile 402 and a measured MISO profile 404 of the bus signals of the MISO. The profile 402 illustrates an example of a good profile of bus signals for the MISO. The profile 402 may be collected for at least one bus cycle. Although the profile 402 illustrates one bus cycle, it should be noted that the profile 402 may be collected for multiple bus cycles.

The profile 404 may represent measured bus signals of the MISO of a target computing device. The profile 404 may be also measured for a bus cycle. As can be seen in FIG. 4, the bus signal 408 of the profile 402 and the bus signal 410 of the profile 404 in the last clock cycle do not match. Thus, when the profile 402 is compared to the profile 404 by the comparator 108, a mismatch may be detected. Thus, the processor of the target computing system may appear to be executing different instructions or perhaps malicious code that has been inserted into the memory of the target computing device.

Thus, the comparator 108 may determine that a hardware security attack has occurred on the target computing device. However, in another example, if the profile 402 were to match the profile 404, then no hardware security attack may be detected.

In one example, when the comparator 108 detects a hardware security attack, the comparator 108 may generate a notification. In one example, the notification may be a boot inhibitor signal that is transmitted to a processor of the target computing device. The boot inhibitor signal may cause the processor of the target computing device to stop executing the boot loader instructions, reset, power down, and the like.

In one example, the notification may notify a user that the hardware security attack has occurred and that the target computing device should not be used. For example, the notification may be sent to a display (illustrated in FIG. 2 and discussed below) that is communicatively coupled to the apparatus 100.

Figure 2:
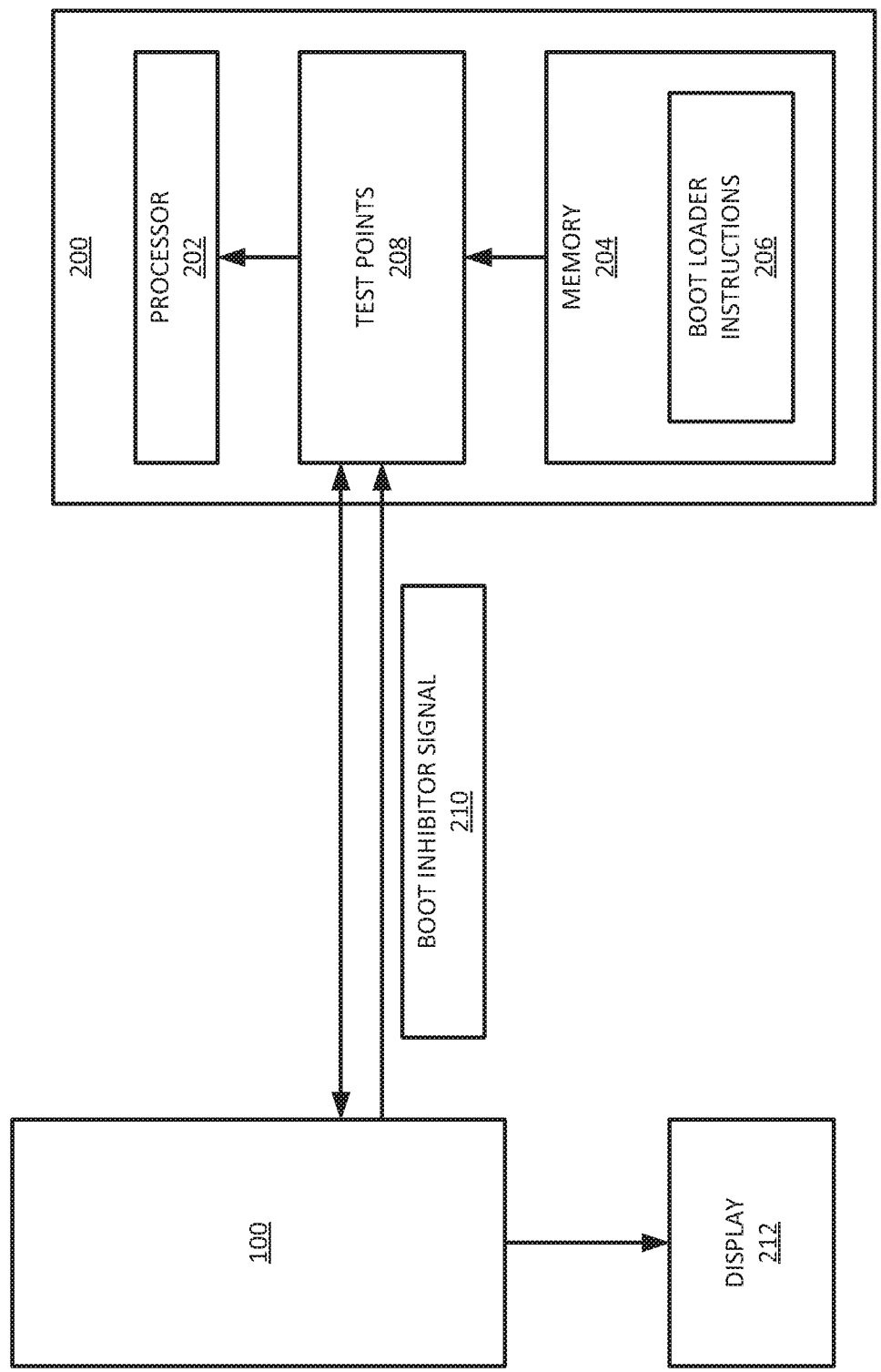
FIG. 2 is a block diagram of the apparatus connected to a system under test of the present disclosure.

FIG. 2 illustrates an example of the apparatus 100 that is connected to a system under test 200 to detect a hardware security attack of the present disclosure. In one example, the apparatus 100 may be the same as the apparatus 100 illustrated in FIG. 1.

In one example, the system under test 200 may be a computing system or device. The system under test 200 may be tested by the apparatus 100 when received by a customer before the system under test 200 is deployed. For example, the customer may check the system under test 200 with the apparatus 100 to determine if the system under test 200 was hacked during or after the system under test 200 was manufactured.

The system 200 may include a processor 202 and a memory 204. The processor 202 may be communicatively coupled to the memory 204 to execute instructions stored in the memory 204. It should be noted that the system under test 200 has been simplified for ease of explanation and may include addition components not shown. For example, the system 200 may include addition interfaces, circuit boards, graphics cards, displays, input/output devices, and the like.

In one example, the memory 204 may be a non-volatile memory (e.g., ROM) that stores boot loader instructions 206. As discussed above, the boot loader instructions may be the BIOS for x86 processor based systems or "u-boot" for non-x86 processor based systems.

The apparatus 100 may be coupled (e.g., removably coupled or in contact with) to test points 208 on the system 200. The test points 208 may be select pins that are adjacent to the processor 202 and located between the processor 202 and the memory 204. The test points 208 may be located as close to the processor 202 as possible to prevent hackers from intercepting the bus signals and modifying the monitored bus signals. In one example, if the traces to the select pins are embedded in the board under ball grid array (BGA) chips on both ends, the traces may be exposed to create the test points 208.

In one example, the pins may be general purpose input output (GPIO) that can be used to measure certain bus signals for a serial peripheral interface (SPI) bus, although other input/output pins on different types of buses of the system 200 may be used. The pins can be used to measure bus signals associated with SCLK, SS, MISO, MOSI, and the like, as illustrated in FIGS. 3 and 4 and described above.

The bus signals may be measured at the test points 208 and received by the apparatus 100 (e.g., via the input sensor 110). The apparatus 100 may then process the bus signals to detect if a hardware security attack has occurred on the system 100, as described above. For example, the apparatus 100 may compare the profile of bus signals measured from the test points 208 to a known profile of bus signals for a known "good" computing device. If the profiles match then no hardware security attack may be detected. If the profiles do not match, then a hardware security attack may be detected.

If a hardware security attack is detected, the apparatus 100 may generate a boot inhibitor signal 210. The boot inhibitor signal 210 may be transmitted to the system 200 and the processor 202. In response to receiving the boot inhibitor signal 210, the processor 202 may stop executing the boot loader instructions, restart, power down, and the like.

In one example, if a hardware security attack is detected a notification may be displayed on a display 212. The display 212 may be a monitor or television that is communicatively coupled to the apparatus 100. The apparatus may include a video interface to connect to the display 212.

Figure 5:
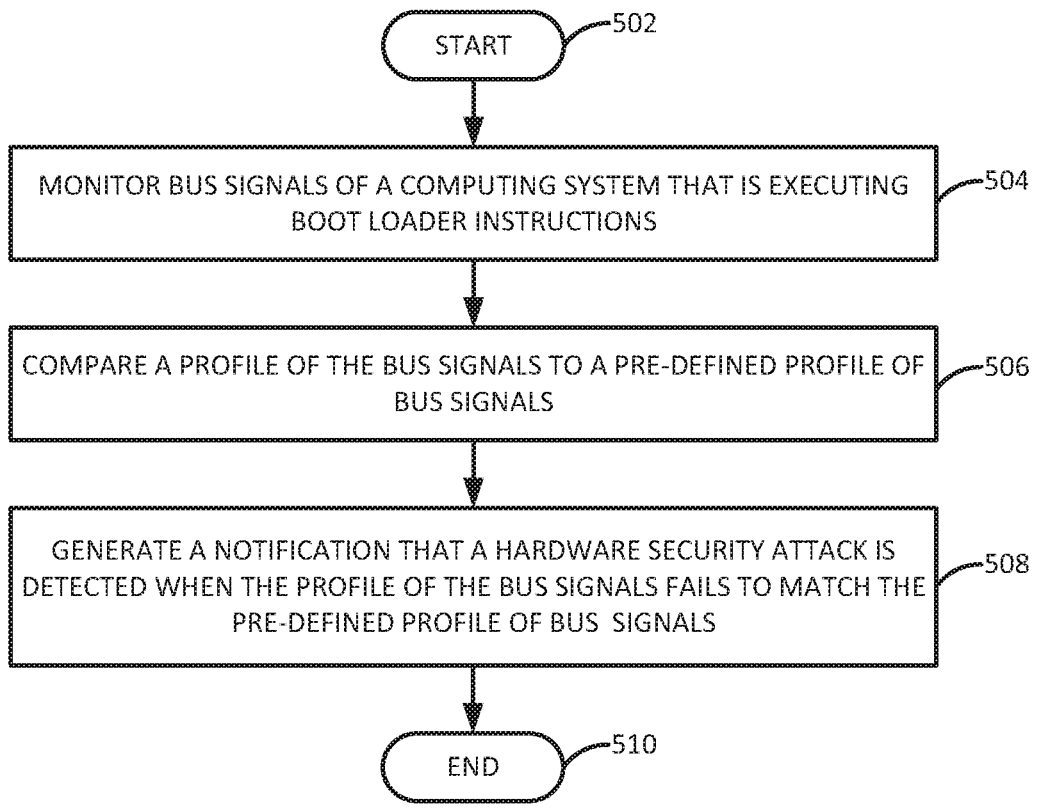
FIG. 5 is a flow chart of an example method for detecting hardware security attacks.

FIG. 5 illustrates a flow diagram of an example method 500 for detecting hardware security attacks. In an example, the method 500 may be performed by the apparatus 100 or the apparatus 600 illustrated in FIG. 6 and described below.

At block 502, the method 500 begins. At block 504, the method 500 monitors bus signals of a computing system that is executing boot loader instructions. For example, the computing system may execute boot loader instructions when a processor of the computing system is powered on. The boot loader instructions may be instructions to initialize the computing system and operating system. The boot loader instructions may be stored in non-volatile memory (e.g., a read only memory (ROM) of the computing device). In one example, for an x86 processor, the boot loader instructions may be the ROM basic input/output system (BIOS). On a non-x86 processor, the boot loader instructions may be a "u-boot".

In one example, the bus signals may be measured from a serial peripheral interface (SPI) of the computing system. For example, probes of the apparatus or trusted measuring device may be coupled to select pins of the SPI located between the processor and the non-volatile memory of the computing device. The bus signals may include a SCLK, SS, and MISO signal for the SPI. In one example, the probes may be coupled to general purpose input output (GPIO) pins of the SPI. After the probe is connected to the desired pins, the computing system may be powered on to begin monitoring of the bus signals as the boot loader instructions are executed by the computing system.

The bus signals may represent each time the processor accesses an instruction from memory. The access may be logged as a clock cycle. A plurality of clock cycles may represent a bus cycle. The bus signals may be tracked over a pre-defined period of time (e.g., at least one bus cycle). The bus signals may generate a profile of the bus signals versus time.

In one example, the bus signals may be stored in a register or a buffer. For example, each detection of a bus signal may be recorded as a value of 1. When no bus signal is detected, the value may be recorded as a value of 0.

At block 506, the method 500 compares a profile of the bus signals to a pre-defined profile of bus signals. In one example, the profile of the bus signals may be provided to a bus signal comparator. The bus signals may be hashed, or a checksum may be applied, to the bus signals that are stored before being provided to the bus signal comparator. Hashing the bus signals may reduce the overall use of memory and processor resources to observe and monitor the bus signals. Any type of hash or checksum may be applied (e.g., a message-digest algorithm 5 (MD5), a secure hash algorithm (SHA), and the like).

In one example, the profile of the bus signals that are monitored during start-up, or power on, of the computing device may be compared to the pre-defined profile of bus signals or a reference profile of bus signals. The pre-defined profile of bus signals may be generated and stored during manufacturing of the computing device when the boot loader instructions are stored in memory. The pre-defined profile of bus signals represents how the processor should operate to execute the boot loader instructions.

Any deviation between the profile of the bus signals that are monitored and the pre-defined profile of bus signals may indicate that the processor and/or other hardware on the computing system may be compromised. In other words, a hardware security attack may be detected when the profile of the bus signals that are monitored does not match the pre-defined profile of the bus signals. As noted above, if a malicious program is installed in the boot loader instructions, the measured signals associated with the execution of the boot loader instructions may have a different profile than expected indicating that the hardware security attack may be detected. If the profile of the bus signals that are monitored matches the pre-defined profile of bus signals, then no hardware security attack may be detected and the processor and/or other hardware on the computing system may be operating as intended.

At block 508, the method 500 generates a notification that a hardware security attack is detected when the profile of the bus signals fails to match the pre-defined profile of bus signals. In one example, notification may be a boot inhibitor signal. The boot inhibitor signal may be transmitted to the processor of the computing device to cause the processor to stop executing the boot loader instructions, restart, power down, and the like.

In one example, the notification may be sent to a display. As a result, a user may see that the hardware on the computing device may be compromised and remove the computing system from use or prevent further operation of the computing system. At block 510, the method 500 ends.

Figure 6:
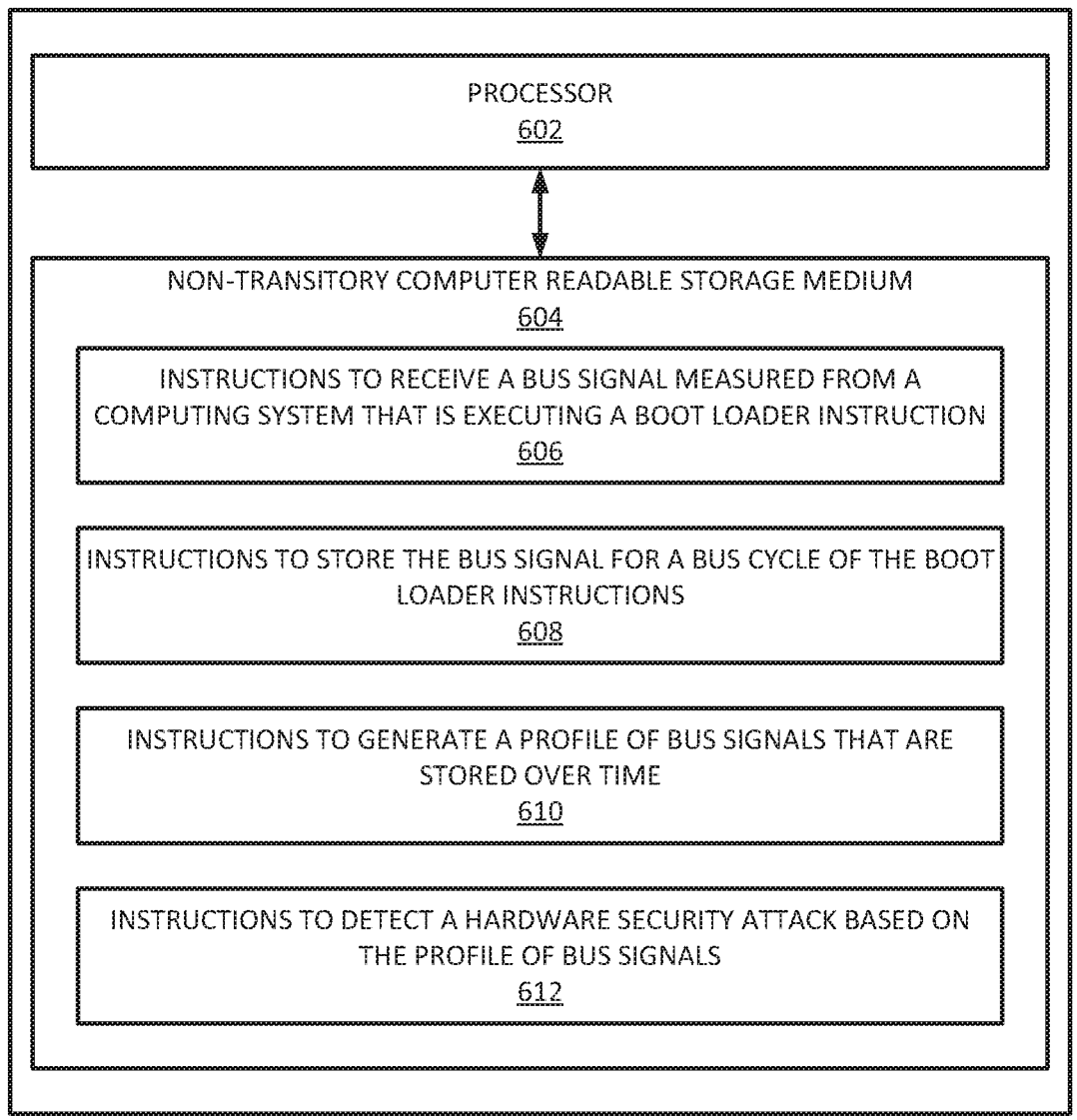
FIG. 6 is a block diagram of an example non-transitory computer readable storage medium storing instructions executed by a processor to detect hardware security attacks.

FIG. 6 illustrates an example of an apparatus 600. In an example, the apparatus 600 may be the apparatus 100. In an example, the apparatus 600 may include a processor 602 and a non-transitory computer readable storage medium 604. The non-transitory computer readable storage medium 604 may include instructions 606, 608, 610, and 612 that, when executed by the processor 602, cause the processor 602 to perform various functions.

In an example, the instructions 606 may include instructions to receive a bus signal measured from a computing system that is executing a boot loader instruction. The instructions 608 may include instructions to store the bus signal for a bus cycle of the boot loader instructions. The instructions 610 may include instructions to generate a profile of bus signals that are stored over time. The instructions 612 may include instructions to detect a hardware security attack based on the profile of bus signals.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus comprising:
   a processor;
   an input sensor to measure states of a plurality of bus signals at different time points during execution of boot loader instructions in a computing device, the plurality of bus signals comprising a chip select signal that is used to select a chip in the computing device, and a further signal that indicates when the processor of the computing device has issued an address, wherein the measured states of the plurality of bus signals comprising the chip select signal and the further signal at the different time points form a first profile of bus signal states;
   a memory to store information of the first profile of bus signal states and information of a reference profile of bus signal states at respective time points, wherein the reference profile of bus signal states at the respective time points represents an operation of the boot loader instructions in an untampered computing device; and
   a comparator to compare the first profile of bus signal states to the reference profile of bus signal states to detect a hardware security attack that caused a change in timing of execution of the boot loader instructions, wherein the processor is communicatively coupled to the input sensor, the memory, and the comparator to control an operation of the input sensor, the memory, and the comparator.

2. The apparatus of claim 1, wherein the input sensor comprises a probe to connect to a test point of the computing device, and wherein the test point comprises a pin adjacent to the processor.

3. The apparatus of claim 1, wherein the first profile of bus signal states comprises 0 and 1 values to indicate whether or not the plurality of bus signals are detected at respective time points of the different time points.

4. The apparatus of claim 1, wherein the plurality of bus signals further comprise a system clock.

5. The apparatus of claim 1, wherein the comparator is to issue a boot inhibitor signal to the processor in response to detecting the hardware security attack, the boot inhibitor signal to cause the processor to stop execution of the boot loader instructions.

6. The apparatus of claim 1, wherein the memory comprises a non-volatile memory to store the information of the reference profile of bus signal states.

7. The apparatus of claim 1, wherein the processor is to apply a hash or a checksum to the first profile of bus signal states to produce a first output value, and the comparator is to compare the first profile of bus signal states to the reference profile of bus signal states by comparing the first output value to a reference output value computed by applying a hash or a checksum to the reference profile of bus signal states.

8. The apparatus of claim 1, wherein the plurality of bus signals correspond to accesses of instructions by the processor from an instruction memory.

9. A method comprising:
   receiving, by a processor, information of a first profile of bus signal states derived from measurements of a plurality of bus signals at different time points during execution of boot loader instructions in a computing system, the plurality of bus signals comprising a chip select signal that is used to select a chip in the computing system, and a further signal that indicates when the processor of the computing system has issued an address;
   comparing, by the processor, the first profile of bus signal states to a reference profile of bus signal states at respective time points, wherein the reference profile of bus signal states at the respective time points represents an operation of the boot loader instructions in an untampered computing system; and
   generating, by the processor, a notification that a hardware security attack that caused a change in timing of execution of the boot loader instructions is detected responsive to the first profile of bus signal states failing to match the reference profile of bus signal states.

10. The method of claim 9, wherein the first profile of bus signal states comprises 0 and 1 values to indicate whether or not the plurality of bus signals are detected at respective time points of the different time points.

11. The method of claim 9, wherein the plurality of bus signals further comprise a system clock.

12. The method of claim 9, comprising:
   in response to detecting the hardware security attack, stopping, by the processor, execution of the boot loader instructions.

13. The method of claim 9, comprising:
   applying, by the processor, a hash or a checksum to the first profile of bus signal states to produce a first output value, wherein the comparing comprises comparing the first output value to a reference output value computed by applying a hash or a checksum to the reference profile of bus signal states.

14. The method of claim 9, wherein the plurality of bus signals correspond to accesses of instructions by the processor from an instruction memory.

15. The method of claim 9, wherein the measurements of the plurality of bus signals are by probes at test points on signal lines carrying the plurality of bus signals.

16. A non-transitory computer readable storage medium comprising instructions that upon execution cause a system to:
receive information of a first profile of bus signal states derived from measurements of a plurality of bus signals at different time points during execution of boot loader instructions in the system, the plurality of bus signals comprising a chip select signal that is used to select a chip in the system, and a further signal that indicates when a processor of the system has issued an address;
compare the first profile of bus signal states to a reference profile of bus signal states at respective time points, wherein the reference profile of bus signal states at the respective time points represents an operation of the boot loader instructions in an untampered system; and
detect a hardware security attack that caused a change in timing of execution of the boot loader instructions based on the comparison of the first profile of bus signal states to the reference profile of bus signal states.

17. The non-transitory computer readable storage medium of claim 16, wherein the information of the first profile of bus signal states comprises a first value derived by applying a hash or a checksum to the first profile of bus signal states, and wherein the comparison of the first profile of bus signal states to the reference profile of bus signal states comprises comparing the first value to a second value derived by applying a hash or a checksum to the reference profile of signal bus states.

18. The non-transitory computer readable storage medium of claim 17, wherein the first profile of bus signal states comprises 0 and 1 values to indicate whether or not the plurality of bus signals are detected at respective time points of the different time points.

19. The non-transitory computer readable storage medium of claim 16, wherein the plurality of bus signals further comprise a system clock.

20. The non-transitory computer readable storage medium of claim 16, wherein the instructions upon execution cause the system to:
transmit a notification in response to detecting the hardware security attack, wherein the notification comprises a boot inhibitor signal to stop execution of the boot loader instructions.

* * * * *